United States Patent [19]

Sawdon

[11] Patent Number: 5,208,973
[45] Date of Patent: * May 11, 1993

[54] APPARATUS FOR JOINING SHEET MATERIAL

[75] Inventor: Edwin G. Sawdon, St. Clair, Mich.

[73] Assignee: BTM Corporation, Marysville, Mich.

[*] Notice: The portion of the term of this patent subsequent to Jul. 19, 2005 has been disclaimed.

[21] Appl. No.: 796,477

[22] Filed: Nov. 22, 1991

Related U.S. Application Data

[60] Continuation-in-part of Ser. No. 748,858, Aug. 23, 1991, Pat. No. 5,177,861, which is a continuation-in-part of Ser. No. 694,141, May 1, 1991, Pat. No. 5,150,513, which is a division of Ser. No. 468,579, Jan. 23, 1990, Pat. No. 5,027,503, which is a division of Ser. No. 175,941, Mar. 31, 1988, Pat. No. 4,910,853, which is a division of Ser. No. 853,130, Apr. 17, 1986, Pat. No. 4,757,609, which is a continuation-in-part of Ser. No. 607,948, May 7, 1984, abandoned, which is a division of Ser. No. 495,440, May 17, 1983, Pat. No. 4,459,735, which is a continuation of Ser. No. 184,951, Sep. 8, 1980, abandoned.

[51] Int. Cl.$^5$ .............................................. B23P 19/00
[52] U.S. Cl. .................................... 29/798; 29/243.5; 29/283.5
[58] Field of Search ............... 29/798, 21.1, 509, 432, 29/432.1, 522.1, 243.5, 243.53, 283.5

[56] References Cited

U.S. PATENT DOCUMENTS

| | | |
|---|---|---|
| Re. 31,535 | 3/1984 | Schleicher . |
| 679,137 | 7/1901 | Baxter . |
| 988,154 | 3/1911 | Thiemer . |
| 1,283,799 | 11/1918 | Kerr . |
| 1,456,079 | 5/1923 | Stuebner . |
| 1,509,997 | 9/1924 | Fry . |
| 1,919,999 | 7/1933 | Borton . |
| 1,926,686 | 9/1933 | Newton . |
| 1,969,214 | 8/1934 | Dit Daude . |
| 1,985,333 | 12/1934 | Wiley . |
| 2,004,182 | 6/1935 | Arey . |
| 2,254,558 | 9/1941 | Williams . |
| 2,333,966 | 11/1943 | Weiss . |
| 2,404,197 | 7/1946 | Sirp . |

(List continued on next page.)

FOREIGN PATENT DOCUMENTS

| | | |
|---|---|---|
| 1237574 | 6/1988 | Canada . |
| 98517 | 8/1898 | Fed. Rep. of Germany . |
| 1452650 | 2/1973 | Fed. Rep. of Germany . |
| 3210208 | 11/1984 | Fed. Rep. of Germany . |
| 415589 | 3/1941 | Japan . |
| 4214680 | 8/1942 | Japan . |
| 48-42707 | 12/1973 | Japan . |
| 54-113753 | 9/1979 | Japan . |
| 56-59540 | 5/1981 | Japan . |
| 664979 | 1/1952 | United Kingdom . |

(List continued on next page.)

OTHER PUBLICATIONS

BTM Corporation-TOG-L-LOC & Lance-N-LOC Sheet Metal Joining Without Welding-6 pages.
BTM Corporation-TOG-L-LOC Sheet Metal Joining System-16 pages.
BTM Corporation-STUD-LOC Strength Data-1 page.

Primary Examiner—P. W. Echols
Assistant Examiner—David P. Bryant
Attorney, Agent, or Firm—Harness, Dickey & Pierce

[57] ABSTRACT

An improved apparatus is disclosed for joining a plurality of pieces of sheet metal or other sheet material items by first drawing and then laterally extruding portions of the material to be joined into an enlarged shape mechanically interlocking the sheet material pieces into a first stage joint. The apparatus includes die portions thereof which are preferably resiliently biased toward one another and pivot or slide laterally in response to lateral extrusion of the joining material to form the first stage joint, which is then forcibly flattened in a press, preferably between two relatively movable anvils, in order to form a second stage joint, thus further enhancing the strength of the mechanical interlock between the sheet material items.

19 Claims, 4 Drawing Sheets

U.S. PATENT DOCUMENTS

| | | |
|---|---|---|
| 2,430,377 | 11/1947 | Vorreyer . |
| 2,467,969 | 4/1949 | Debrot, Jr. . |
| 2,555,836 | 6/1951 | Werich . |
| 2,619,855 | 12/1952 | Williams . |
| 2,626,687 | 1/1953 | Williams . |
| 2,632,929 | 3/1953 | Poupitch . |
| 2,663,072 | 12/1953 | Pfistershammer . |
| 2,671,361 | 3/1954 | Sandberg . |
| 2,685,719 | 8/1954 | Golden . |
| 2,713,197 | 7/1955 | Schmidt . |
| 2,865,451 | 12/1958 | Ihrig . |
| 2,924,312 | 2/1960 | Williams . |
| 2,937,681 | 5/1960 | Patten . |
| 3,157,942 | 11/1964 | MacLean, Jr. . |
| 3,177,914 | 4/1965 | MacLean, III et al. . |
| 3,178,749 | 4/1965 | Heepe . |
| 3,187,796 | 6/1965 | Double . |
| 3,198,155 | 8/1965 | Fraze . |
| 3,202,112 | 8/1965 | Oakley . |
| 3,233,259 | 2/1966 | MacLean, III et al. . |
| 3,315,345 | 4/1967 | Double et al. . |
| 3,338,463 | 8/1967 | Henrickson . |
| 3,357,388 | 12/1967 | Dunn . |
| 3,359,935 | 12/1967 | Rosbottom . |
| 3,404,648 | 10/1968 | Rosbottom . |
| 3,439,723 | 4/1969 | Double et al. . |
| 3,451,367 | 6/1969 | Henrickson . |
| 3,469,613 | 9/1969 | Steward . |
| 3,470,596 | 10/1969 | Belada . |
| 3,506,050 | 4/1970 | Pouch et al. . |
| 3,599,318 | 8/1971 | Behlen . |
| 3,615,274 | 10/1971 | Belada . |
| 3,726,000 | 4/1973 | Hafner . |
| 3,771,216 | 11/1973 | Johnson . |
| 3,791,016 | 2/1974 | Eberhardt et al. . |
| 3,810,290 | 5/1974 | Grube . |
| 3,829,957 | 8/1974 | Pouch et al. . |
| 3,862,485 | 1/1975 | Hafner . |
| 3,865,047 | 2/1975 | Hlinsky et al. . |
| 3,877,133 | 4/1975 | Grube . |
| 3,885,299 | 5/1975 | Hafner . |
| 3,900,937 | 8/1975 | Schleicher . |
| 3,919,955 | 11/1975 | DuVernay . |
| 3,920,059 | 11/1975 | Grube . |
| 3,921,276 | 11/1975 | Oaks . |
| 3,924,378 | 12/1975 | Hafner . |
| 3,934,327 | 1/1976 | Hafner . |
| 3,969,808 | 7/1976 | Goodsmith et al. . |
| 3,981,064 | 9/1976 | Hafner . |
| 3,999,659 | 12/1976 | Grube . |
| 4,035,901 | 7/1977 | Lux et al. . |
| 4,059,897 | 11/1977 | Marquis . |
| 4,064,617 | 12/1977 | Oaks . |
| 4,069,902 | 1/1978 | Zdeb . |
| 4,094,352 | 6/1978 | Hlinsky . |
| 4,153,989 | 5/1979 | Shinjo . |
| 4,203,187 | 5/1980 | Grube . |
| 4,208,776 | 6/1980 | Schleicher . |
| 4,237,567 | 12/1980 | Grube . |
| 4,242,793 | 1/1981 | Matthews et al. . |
| 4,269,248 | 5/1981 | MacLean et al. . |
| 4,281,699 | 8/1981 | Grube . |
| 4,384,667 | 5/1983 | Smallegan et al. . |
| 4,394,794 | 7/1983 | Shirey . |
| 4,459,735 | 7/1984 | Sawdon . |
| 4,484,385 | 11/1984 | Woods . |
| 4,525,912 | 7/1985 | Kazino et al. . |
| 4,531,279 | 7/1985 | Gunter . |
| 4,569,111 | 2/1986 | Mutou . |
| 4,574,453 | 3/1986 | Sawdon . |
| 4,574,473 | 3/1986 | Sawdon . |
| 4,601,090 | 7/1986 | Gunter . |
| 4,610,072 | 9/1986 | Muller . |
| 4,722,647 | 2/1988 | Sawdon . |
| 4,752,993 | 6/1988 | Oaks . |
| 4,757,609 | 7/1988 | Sawdon . |
| 4,803,767 | 2/1989 | Obrecht et al. . |
| 4,878,284 | 11/1989 | Sawdon . |
| 4,910,853 | 3/1990 | Sawdon . |
| 5,027,503 | 7/1991 | Sawdon . |
| 5,031,442 | 7/1991 | Kynl . |

FOREIGN PATENT DOCUMENTS

| | | |
|---|---|---|
| 708236 | 4/1954 | United Kingdom . |
| 895561 | 5/1962 | United Kingdom . |
| 930164 | 7/1963 | United Kingdom . |
| 934101 | 8/1963 | United Kingdom . |
| 945110 | 12/1963 | United Kingdom . |
| 1008914 | 11/1965 | United Kingdom . |
| 1041119 | 9/1966 | United Kingdom . |
| 1101795 | 1/1968 | United Kingdom . |
| 1114826 | 5/1968 | United Kingdom . |
| 1202275 | 8/1970 | United Kingdom . |
| 1378534 | 12/1974 | United Kingdom . |
| 1551353 | 8/1979 | United Kingdom . |
| 2055648A | 3/1981 | United Kingdom . |
| 2069394A | 8/1981 | United Kingdom . |
| 2071000B | 9/1981 | United Kingdom . |

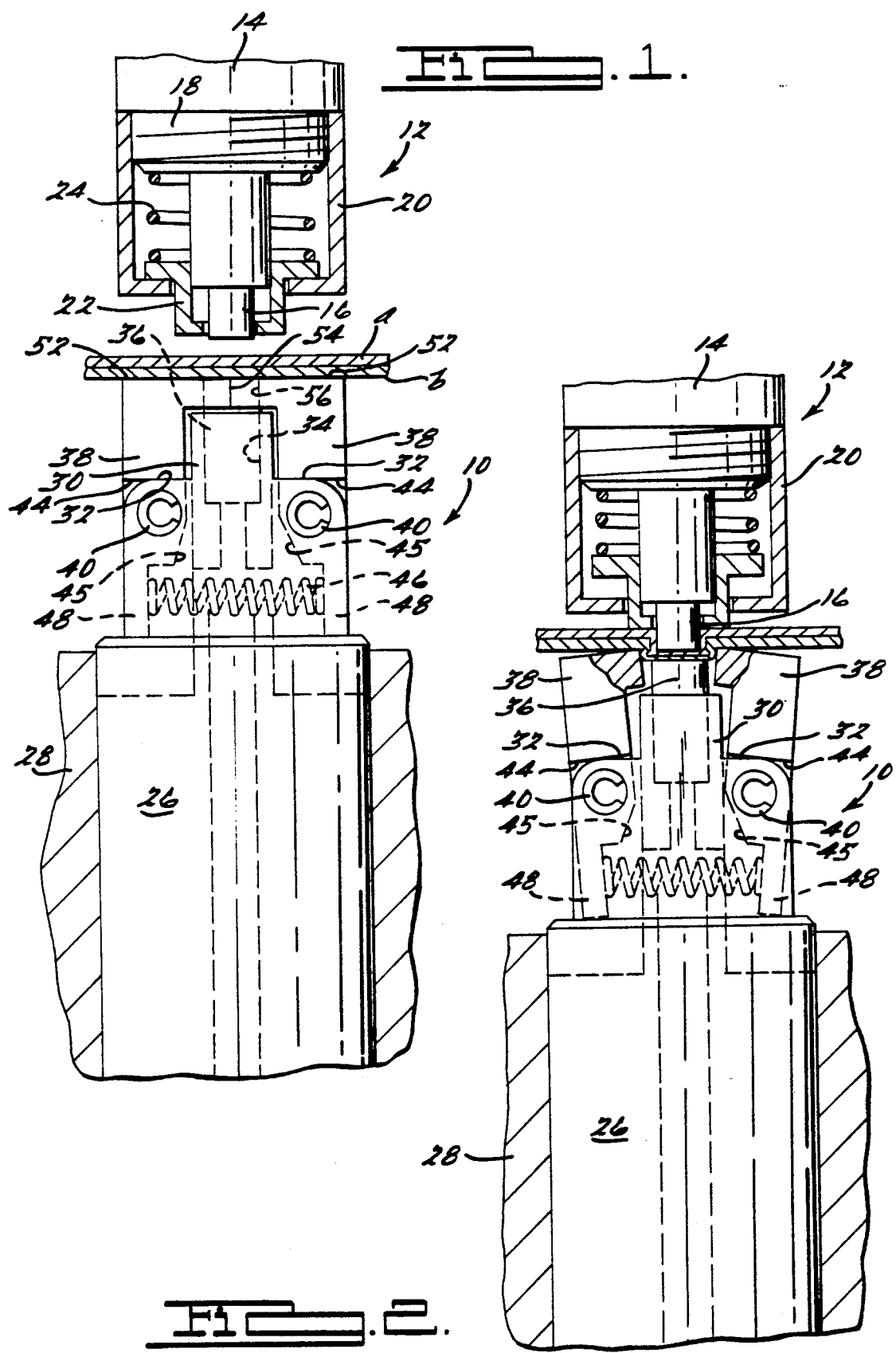

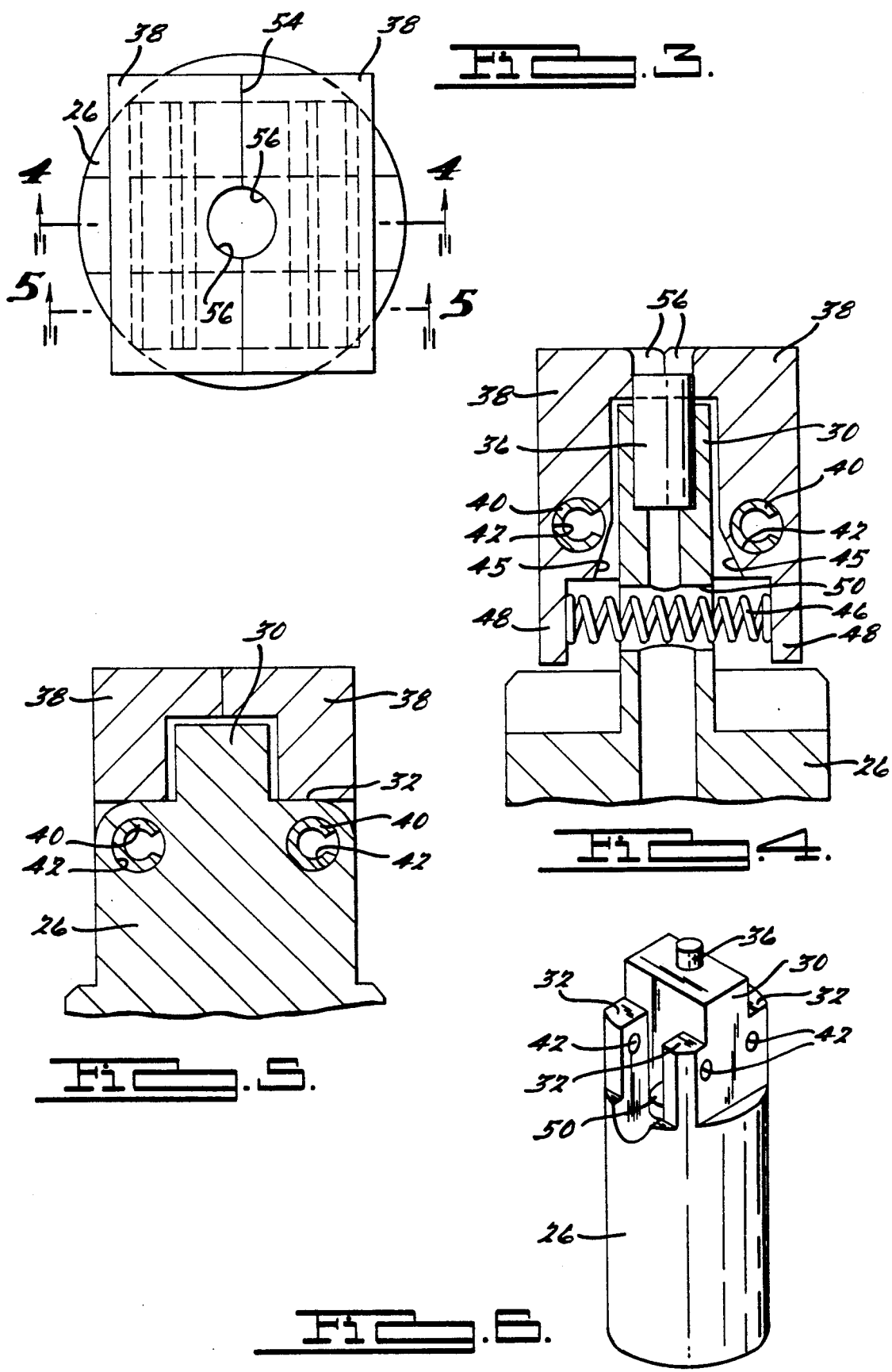

APPARATUS FOR JOINING SHEET MATERIAL

CROSS-REFERENCE TO RELATED APPLICATIONS

This is a continuation-in-part of copending U.S. patent application, Ser. No. 748,858, filed Aug. 23, 1991, now issued as U.S. Pat. No. 5,177,861 which is a continuation-in-part of copending Ser. No. 694,141, filed May 1, 1991, now issued as U.S. Pat. No. 5,150,513 which is a division of Ser. No. 468,579, filed Jan. 23, 1990, now issued as U.S. Pat. No. 5,027,503, which was a division of Ser. No. 175,941, filed Mar. 31, 1988, now issued as U.S. Pat. No. 4,910,853, which was a division of Ser. No. 853,130, filed Apr. 17, 1986, now issued as U.S. Pat. No. 4,757,609, which was a continuation-in-part of Ser. No. 607,948, filed May 7, 1984, now abandoned, which was a division of Ser. No. 495,440, filed May 17, 1983, now issued as U.S. Pat. No. 4,459,735, which was a continuation of Ser. No. 184,951, filed Sep. 8, 1980, now abandoned. The disclosures of the aforesaid applications, Ser. No. 748,858, filed Aug. 23, 1991, and Ser. No. 694,141, filed May 1, 1991, are hereby incorporated herein by reference.

BACKGROUND AND SUMMARY OF THE INVENTION

The present invention relates generally to joining sheet metal or other sheet materials and more particularly to an apparatus for forming such joints which are leakproof and have an enhanced mechanical interlock.

It is old in the art to join a plurality of pieces of sheet metal by punching or otherwise manipulating them to cause them to be deformed into an interlocking relationship in a localized area. However, insofar as Applicant is aware, many such joints typically require the shearing of the sheet material and hence are not suitable for leakproof applications unless a sealant is applied. The formation of such joints is also frequently destructive of the corrosion resistance of coated materials. In addition, the known apparatuses for forming the joints are frequently relatively complex in design, often requiring powered actuation of both a punch and one or more portions of the die, and frequently require expensive and complicated sliding die portions. This complexity increases the cost of the equipment, as well as the energy required for operation.

It has therefore been a primary object of the inventions of Applicant's aforesaid prior applications for patents to provide an improved method and apparatus for permanently joining sheet metal or other sheet material items with the capability of forming either leakproof joints or partially "lanced" joints. Additional objects resided in the provision of such a forming apparatus that is relatively simple but durable in construction, that can utilize standard or specialized punches, that requires very little power, that is compact and hence usable in many different applications, that substantially preserves the corrosion resistance of coated sheet materials being joined, and that is suited for use either as part of a small press or in C-frame holders in larger presses. Other objects resided in the provision of an improved die assembly for use in sheet material joining apparatuses, and which is readily adapted to many different joint configurations, including conventional or partially "lanced" joints as well as a novel leakproof joint.

A number of versions of Applicant's joining techniques have been disclosed and/or patented in the aforesaid patents and applications for patent, including one which has as its object the provision of a further improvement in which leakproof joints can be formed which have the visual appearance of rivets, and which therefore can be used in decorative highly visible applications, such as on the outside sides of a vehicular bus or other vehicles, or on the outside surfaces of appliances, or similar applications. Because this is accomplished using the same general principles of operation as Applicant's aforesaid prior inventions, such improvement also meets many of the objects of the prior inventions.

Although Applicant's prior developments discussed above have performed well and have represented significant strides forward in the art, thus enjoying considerable commercial success and acceptance in the industry, the present invention seeks to further enhance the mechanical interlock and joint strength, including the resistance to shearing and peeling forces exerted on the joint. In accordance with the present invention, this enhancement of the joint is accomplished by forcibly flattening the first stage of the joint, which is preferably substantially the same as the joint formations of Applicant's prior developments, thereby forming a second stage joint with such enhanced characteristics. In a preferred form of the invention, such flattening to form the second stage joint is accomplished by placing the formed first stage joint between a pair of anvils that are forcibly movable longitudinally relatively toward one another in order to flatten the first stage joint therebetween. These secondary anvils can both be separate from the anvil typically used in the forming of the first stage joint, or one of the secondary anvils can be the same as the anvil used in forming the first stage joint.

These and other objects, features and advantages of the present invention will become apparent from the subsequent description and the appended claims, taken in conjunction with the accompanying drawings.

BRIEF DESCRIPTION OF THE DRAWINGS

FIG. 1 is a partial front elevational view, partly in section, of an earlier embodiment of an apparatus for forming a leakproof first stage sheet material joint, incorporating the principles of the present invention and shown in its retracted position.

FIG. 2 is a view similar to FIG. 1, but showing the apparatus in its advanced position.

FIG. 3 is an end view of the die apparatus of FIGS. 1 and 2.

FIG. 4 is a cross-sectional view taken generally along line 4—4 of FIG. 3.

FIG. 5 is a cross-sectional view taken generally along line 5—5 of FIG. 3.

FIG. 6 is a perspective view of the die body of FIGS. 1 through 5, but shown with the dies and other components removed for purposes of illustration.

DETAILED DESCRIPTION OF THE PREFERRED EMBODIMENTS

Figure 7:
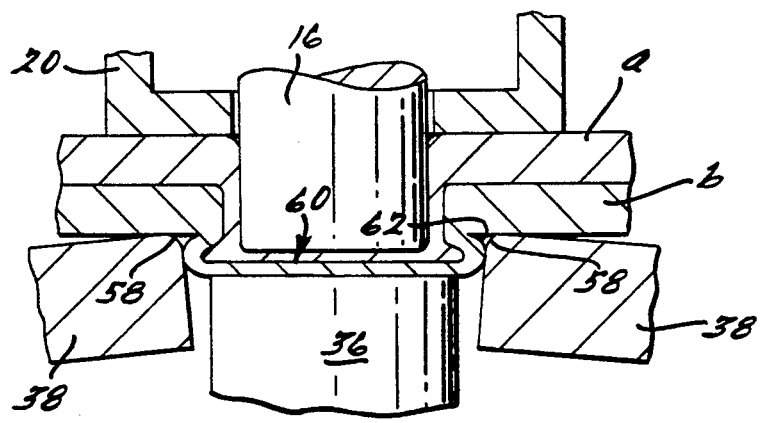
FIG. 7 is an enlarged partial sectional view illustrating the leakproof joint at the point of completion of its formation.

FIGS. 1 through 12 illustrate several exemplary prior embodiments of the present invention for purposes of illustration. One skilled in the art will readily recognize from the following discussion, taken together with the drawings, that the principles of the present invention are equally applicable to embodiments of the invention other than those shown in the drawings. One skilled in the art will also readily recognize that the principles of the present invention are applicable to both sheet metal as well as various other formable sheet materials.

Referring to FIGS. 1 through 7, a sheet metal joining apparatus generally includes a die assembly 10 and a punch assembly 12 for joining two pieces of sheet metal or other formable sheet material indicated at a and b respectively. Although only two pieces of sheet material are shown, it is to be understood that more than two pieces may be joined in accordance with the principles of the present invention, depending upon the composition and thicknesses of sheet material in question. It is envisioned that the most common materials to be joined by the present invention will include sheet stock materials, such as aluminum, galvanized, brass, steel, etc., both coated and uncoated. The invention is particularly useful and advantageous in joining sheet material items composed of different materials where such dissimilar materials cannot be welded to one another.

Punch assembly 12 is of conventional construction, including a punch body 14 mounting a circular punch 16 and having a threaded portion 18 for threadably supporting a stripper retainer 20. Disposed within retainer 20 is a stripper 22 biased to its stripping position illustrated in FIG. 1 by means of one or more coil springs 24. Punch 16 preferably has a smooth flat tip, with a small radius at the edge as shown in FIG. 7.

Die assembly 10 comprises cylindrical die body 26 mounted in the usual manner within a support structure 28 which may either be the lower leg of a conventional "C-frame" clamping device for use in a standard press, or the lower die supporting portion of a small press, such as a press of the type disclosed in Applicant's U.S. Pat. No. 3,730,044. Die body 26 is provided at its upper end (as shown) with an integral boss 30, from the opposite sides of which extend shoulders 32. Die body 26 is centrally bored and at the upper end thereof is provided a bore portion 34 in which is disposed (as by press fit) a hardened pin 36 which acts as an anvil or lower die member.

Pivotally supported on each side of die body 26, by means of roll pins 40 or other pivot members located in apertures 42, is a die portion or die segment 38. Each die portion or segment 38 is generally T-shaped in side elevation and is provided with shoulders 44 engageable with the shoulders 32 on die body 26, so that vertical forces exerted on the die portions are transmitted directly to the die body and are not absorbed by pivot pins 40. Die portions 38 are relieved at 45 to facilitate limited rotational or pivotal movement between the respective positions illustrated in FIGS. 1 and 2, and are maintained in a normally closed position, as shown in FIG. 1, by means of a coil spring 46. Spring 46 passes through a suitable aperture extending through boss 30 and biasingly acts between downwardly-extending integral legs 48 on die portions 38.

When die portions 38 are in their closed position illustrated in FIG. 1, the upper surfaces 52 thereof lie in a common horizontal plane and the abutting faces of the die portions lie in a common vertical plane 54 (or planes 54 where more than two die portions are used). In this embodiment die portions 38 are each provided with a complementary semi-circular recess 56 centered on plane 54 and defining, when the die portions are in their closed position, an opening having a shape complementary to that of punch 16. Forces exerted downwardly on die portions 38 by punch 16 acting on the workpieces will not tend to pivot them away from one another because the pivotal axes defined by roll pins 40 are disposed laterally outwardly of the edges of the opening defined by recesses 56. Thus any downward force exerted on the die portions by the punch, such as when the punch initially enters the die opening, will tend to close, rather than open, the die assembly. In this embodiment the edge of the opening defined by recesses 56 should be chamfered or radiused, as indicated at 58 (FIG. 7), to reduce the chance of fracturing or shearing the sheet material workpieces.

In operation, the apparatus is initially in the position illustrated in FIG. 1. Two or more sheet material items are first positioned in an overlapping or face-to-face relationship and then placed into the apparatus, as shown in FIG. 1, with the lower surface of the sheet material assembly disposed on surfaces 52 of die portions 38. Thereafter the press or other apparatus is actuated to cause the punch to move downwardly (as shown) towards material items a and b and die assembly 10.

Upon engagement of die punch 16 and the sheet material, portions 60 of the sheet material items a and b are deformed and drawn downwardly toward the upper surface of anvil 36. There is no fracturing or shearing of the material because of the provision of radius 58 around the periphery of the opening defined by recesses 56 and because of a preferably uniform clearance between die portions 38 and punch 16. The drawing action results directly from the coaction of the punch and the opening defined by recesses 56 in die portions 38. As punch 16 approaches anvil 36, within the die opening, and reaches a distance from anvil 36 that is less than the total combined original thickness of sheet material pieces a and b, there is a transverse or lateral extrusion of the sheet material portions 60 to form the laterally enlarged shape 62 in FIG. 7, which results in a mechanical interlock between sheet material pieces a and b. In this regard, it should be noted that FIG. 7 is not drawn to scale, but is intended to provide a representative illustration of the cross-sectional configuration of the material portions forming the first stage joint.

The force of the lateral extrusion of sheet material portions 60 causes die portions 38 to pivot laterally outwardly, as best illustrated in FIGS. 2 and 7. A strong, permanent and leakproof first stage joint having been formed, the punch is then withdrawn to the position illustrated in FIG. 1 and the workpiece removed. It is noteworthy that in Applicant's illustrated apparatus, only punch 16 requires actuation, and anvil 36 remains fixed. In certain applications, however, the punch can be stationary with the die assembly being actuable, or other arrangements providing for relative movement between the punch and die assembly can also be used. Upon removal of the workpiece, spring 46 causes die portions 38 to pivotally move back to their closed position illustrated in FIG. 1.

Shearing or lancing of the sheet material portions is avoided in the aforedescribed apparatus by providing radius 58 and an appropriate clearance between punch 16 and the opening defined by recesses 56. This clearance is preferably of uniform width. Although Applicant has not fully optimized the respective dimensions of the parts, the formulae below establish dimensions which have been found to provide very satisfactory results:

$$P = 2(M1 + M2) \ (+/-20\%)$$

$$D = P + 0.8(M1 + M2)$$

$$T + 0.2(1.2(M1 + M2))$$

Where:
 P = punch diameter
 D = die diameter
 M1 = top sheet material thickness
 M2 = bottom sheet material thickness
 T = total sheet material thickness at center of joint These relationships have been found to at least be a satisfactory starting point. Once the punch diameters are chosen, and the apparatus is assembled and tested, satisfactory results can be obtained for the materials being joined by adjusting the bottom anvil height using the standard "shut height" adjustment (not shown) provided on conventional small presses and C-frames, thereby adjusting the distance between the bottom of the punch and the anvil when the press is at the end of its downward stroke.

Figure 8:
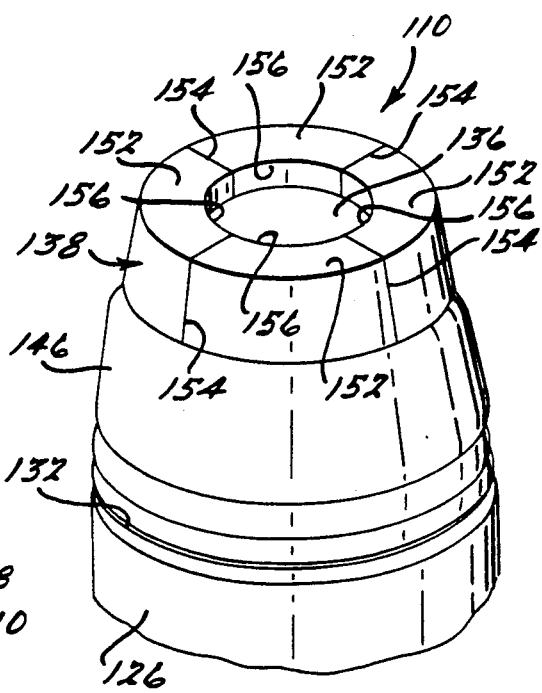
FIG. 8 is a partial perspective view of another prior embodiment of an apparatus incorporating the principles of the present invention, and which is applicable to the formation of a leakproof first stage sheet material joint.
Figure 9:
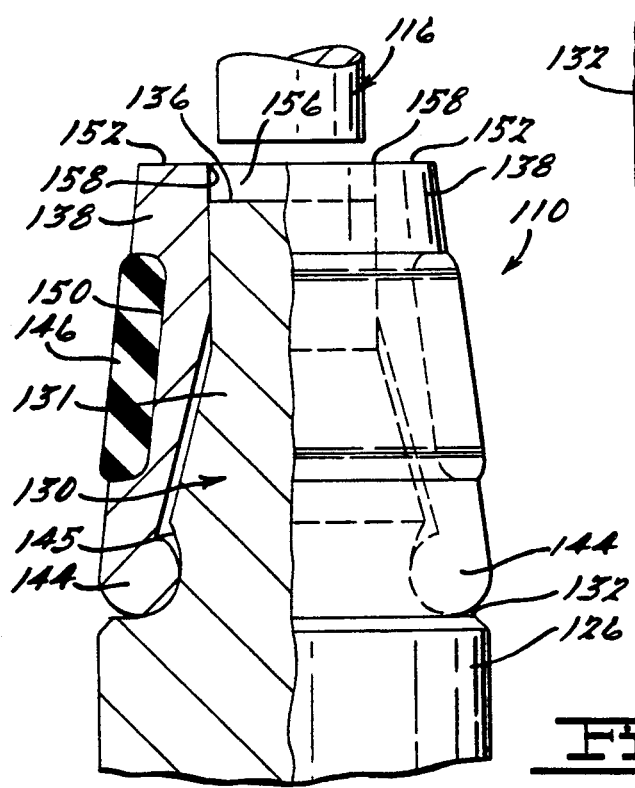
FIG. 9 is a partial elevational view of the apparatus of FIG. 8, with a portion of the apparatus shown in longitudinal cross-section.
Figure 10:
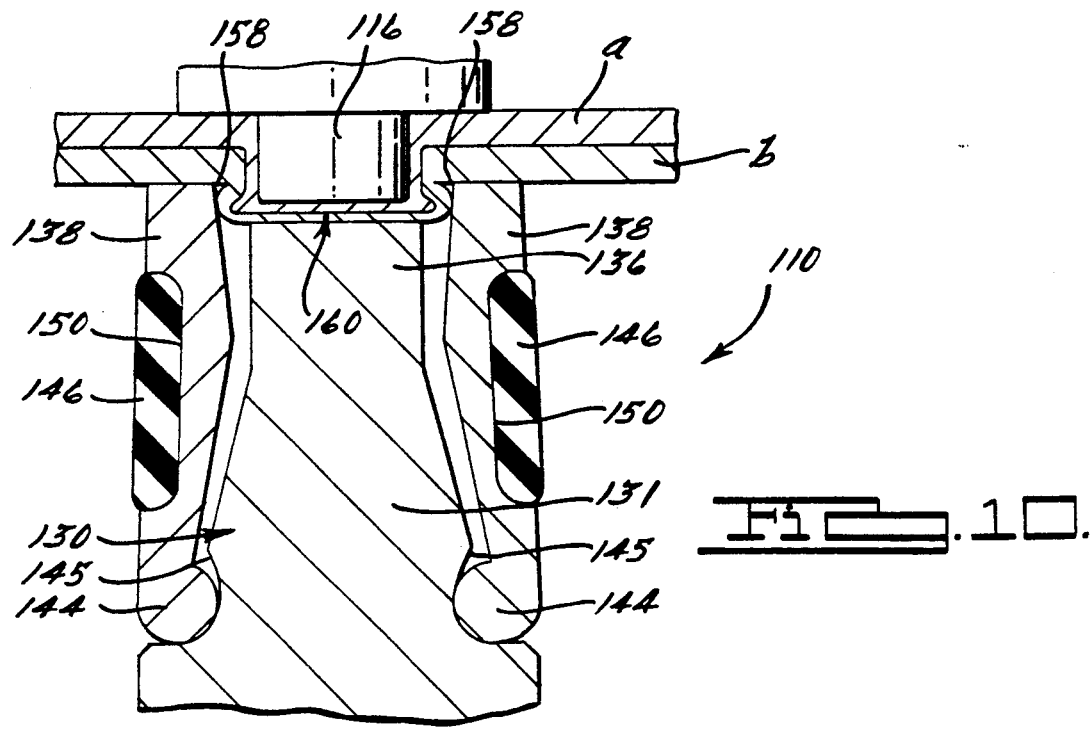
FIG. 10 is a partial sectional view of the apparatus of FIGS. 8 and 9, illustrating the apparatus substantially at the point of completion of the leakproof first stage joint.

FIGS. 8 through 10 illustrate another embodiment of the apparatus for joining sheet material items to one another in a leakproof first stage joint. In this embodiment, die assembly 110, which is adapted to cooperate with punch 116 to form the leakproof first stage joint, includes die body 126 having an integral boss 130 and a circular annular shoulder 132 thereon. Integral boss 130 includes conical portion 131 interconnecting an anvil 136 with shoulder 132.

Two or more arcuate die segments 138 are disposed around boss 130 and include die segment shoulders 144 which are supported and engaged by shoulder 132 of die body 126. Boss 130 is provided with a circular annular relieved portion 145 adjacent the shoulder 132. This relieved portion 145 provides clearance so that the die segments 138 can primarily pivot (but also slide) outwardly as the joint is being completed, in substantially the same manner as die portions 38 described above in connection with the embodiments of FIGS. 1 through 7.

Die portions 138 are maintained in their normally-closed position, shown in FIGS. 3 and 9, by means of a resilient, elastomeric band 146, which surrounds the lateral sides of die segments 138 in order to resiliently bias die segments 138 in a radially or laterally inwardly direction toward the longitudinal center axis of the die assembly. Resilient band 146 is received within, and longitudinally restrained by, a laterally inwardly recessed groove 150 extending circumferentially around the die segments 138. Although resilient band 146 can be composed of any of a wide variety of elastomeric materials suitable for particular applications of the present invention, it is preferred that resilient band 146 be composed of a urethane or urethane-containing material.

When die segments 138 are in their closed positions illustrated in FIGS. 8 and 9, the upper surfaces 152 lie in a common plane and the abutting faces of adjacent die segments lie in planes indicated by reference numeral 154. In the embodiment shown in FIGS. 8 and 9, die portions 138 are provided with circular inside faces 156 that define a circular opening generally complementary with the cross-sectional shape of punch 116. Die portions 138 are also provided with radiused edge portions 158, and are preferably uniformly spaced from punch 116, in order to substantially avoid shearing or tearing sheet material items a and b during the deformation of sheet material. Like the embodiments shown in FIGS. 1 through 7, the downward force exerted on die portions 138 by punch 116 will tend (at least initially) to close, rather than open, the die assembly 110. This is because the primarily pivotal and longitudinally supported engagement of die segment shoulders 144 with die body shoulder 132 is at a radially or laterally outwardly disposed position relative to edge portions 158. Furthermore, shoulder 132 defines a solid surface easily capable of handling the axial loads on die segments 138 during operation of the apparatus.

In operation, die assembly 110 is similar in function to die assembly 10 of FIGS. 1 through 7 described above. However, the resilient band 146, with its inwardly-biasing and circumferentially continuous relationship with die segments 138, is believed to cause die segments 138 to be more uniformly inwardly-biased, thereby providing for a more uniform and controlled deformation of sheet material portions 160 into the circular opening formed by die segments 138. Furthermore, the respective clearances of the parts are based on the same criteria as used in the embodiments of FIGS. 1 through 7, so that sheet material portions 60 are drawn into the opening defined by recesses 156 in a non-fractured and non-sheared uniform configuration. As in the original embodiments, the action of punch 116 against anvil 136 causes radial or lateral extrusion of the sheet material to form the leakproof first stage joint, in the manner illustrated in FIG. 11. The resilient band 146, in addition to contributing to a uniform and controlled formation of a first stage joint, also provides substantial simplicity and economy in the manufacture, operation and maintenance of the die assembly.

Although the exemplary embodiment shown in FIGS. 8 through 10 illustrates the use of a circular punch 116, other shapes may be used, depending upon the particular application and the strength required. Examples of such shapes, and the modifications necessary to the apparatus in order to form such shapes, are shown in the aforesaid prior applications and patents. Also, it should be noted that the number of die segments in any of the embodiments shown is for purposes of illustration only, and the various embodiments of the invention can have two die segments, three die segments or any other reasonable number of die segments.

Figure 11:
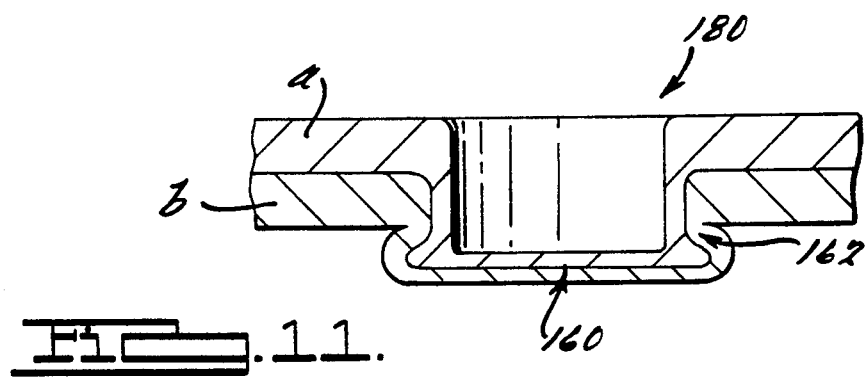
FIG. 11 is an enlarged sectional view of a first stage joint formed by the apparatuses of FIGS. 1 through 7 or FIGS. 8 through 10.

FIG. 11 illustrates the formed first stage, or primary, joint 180 between the sheet material items a and b, with the extruded, interlocked portions 160 thereof, as formed by the exemplary apparatuses of FIGS. 1 through 7 or FIGS. 8 through 10. As mentioned above, this joint has performed exceedingly well and, being leakproof, is suitable for a wide variety of joining applications. However, in certain applications, even more joint strength and resistance to separation resulting from shearing or peeling forces, for example, is needed or desired.

Figure 12:
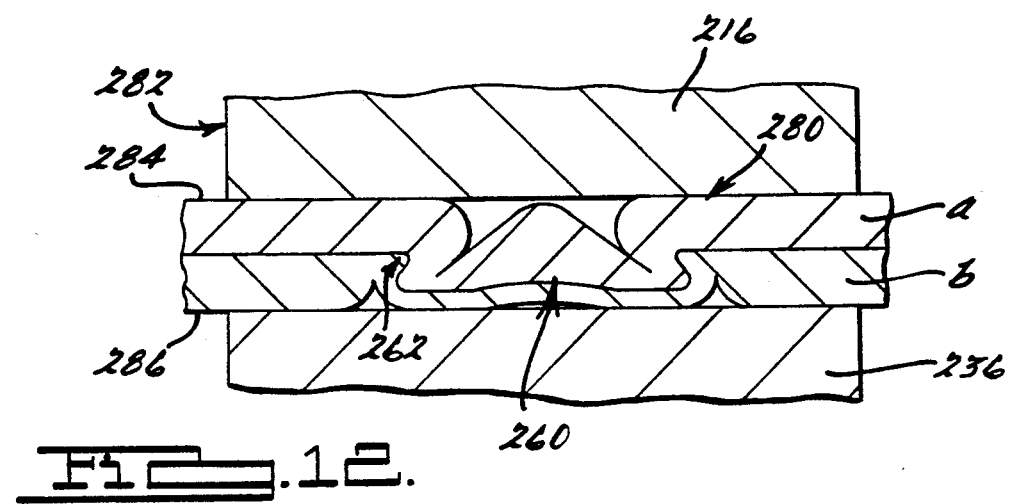
FIG. 12 is an enlarged sectional view of the sheet material joint after being flattened in a press means to form the second stage joint according to the present invention.

Thus, in accordance with the present invention, the first stage joint 180 of the sheet material items a and b is placed in a press apparatus 282, shown in exemplary form in FIG. 12, and flattened between an anvil 216 and an anvil 236, which are forcibly movable longitudinally, relatively toward one another, with the first stage joint 180 therebetween, in order to form a second stage joint 280. Although not expressly shown in FIG. 12, the press apparatus 282 can be operated by actuating apparatuses similar to those used for the apparatuses of the preceding drawing figures, including conventional small presses and C-frames, as discussed above.

In the flattening and formation of the second stage, or secondary, joint 280, the previously-extruded sheet material portions 160 are substantially flattened and forced inwardly toward the remainder of the sheet material items a and b and are preferably deformed to lie substantially within the outer planes or surfaces 284 and 286 of the sheet material items a and b, respectively, as shown in the portions 260 of FIG. 12, which has a substantially flat (but perhaps slightly dimpled) surface in the plane 286. During such secondary forming, the areas 262 are further deformed inwardly in both the lateral and longitudinal directions, thus resulting in the interlocked configuration shown illustratively in FIG. 12. This formation enhances the mechanical interlock, and thus the strength of the final, assembled joint, over even that of the first stage joint 180, and the enhancement is due at least in part to the further-interlocking engagement of the sheet material portions 262. It should be noted that in FIG. 12, the joint is not shown to scale, but is exaggerated somewhat for purposes of clarity in illustrating the cross-sectional shape.

The anvils 216 and 236 preferably have substantially flat end surfaces and are large enough to cover an area on the planes or surfaces 282 and 286 that is substantially greater than the first stage joint 180. Furthermore, although the anvils 216 and 236 of the press apparatus 282 are typically and preferably separate from the anvil 36 or 136 discussed above, such anvils 36 or 136 can, in appropriate applications, be arranged so as to do double duty, substituting for one of the anvils 216 or 236, thereby being involved in both stages of the forming of the final, secondary joint 280.

The foregoing discloses and describes exemplary embodiments of the present invention. One skilled in the art will readily recognize from such description, and from the accompanying drawings, that various changes, modifications and variations may be made therein without departing from the spirit and scope of the invention as defined in the following claims.

What is claimed is:

1. An apparatus for joining two or more overlying sheet material items having a combined thickness, the apparatus including punch means and further comprising:

first and second die members having operative portions configured to cooperate with the punch means to forcibly deform portions of the sheet material items into a first stage joint therebetween without shearing the sheet material items when the punch means and said die members are moved relatively toward one another in a generally longitudinal direction, said die members defining an opening for receiving the sheet material portions during such deformation into said first stage joint;

means for mounting the operative portions of said die members for lateral movement with respect to one another;

an anvil disposed in said opening and having an end surface against which the sheet material portions can be pressed by said punch means during said deformation into said first stage joint; and press means for forcibly flattening said first stage joint in order to form a flattened second stage joint, said flattened second stage joint lying within the combined thickness of the sheet material items.

2. An apparatus according to claim 1, wherein said end surface of said anvil is generally flat.

3. An apparatus according to claim 2, wherein said punch means also has a generally flat end surface.

4. An apparatus according to claim 1, wherein said anvil is a first anvil, and said press means includes a second anvil and a third anvil forcibly movable relatively toward one another with said first stage joint therebetween in order to flatten said first stage joint into said second stage joint.

5. An apparatus according to claim 4, wherein said second and third anvils are separate from said first anvil.

6. An apparatus according to claim 4, wherein said first anvil and one of said second and third anvils are the same anvil.

7. An apparatus according to claim 1, wherein the end of said punch means has a configuration which is generally parallel to that of said end surface of said anvil.

8. An apparatus according to claim 1, wherein said opening has a shape at least in part complementary to the cross-sectional shape of the punch means.

9. An apparatus according to claim 1, further comprising means for biasing said die members toward one another.

10. An apparatus according to claim 1, wherein said opening is substantially complementary in shape to the cross-sectional shape of said punch means and provides a uniform clearance between said punch means and said die members in order to prevent shearing of said sheet material items when the sheet material portions are forcibly deformed into said opening.

11. An apparatus according to claim 1, wherein said anvil is longitudinally fixed relative to said die members.

12. An apparatus according to claim 1, further comprising a die body, and support means on said die body directly engageable with said die members to absorb loads taken by said die members as a result of actuation of said punch means.

13. An apparatus according to claim 1, wherein said die members pivot laterally with respect to one another.

14. An apparatus according to claim 1, wherein said die members move rectilinearly with respect to one another in a lateral direction.

15. An apparatus according to claim 14, wherein said die members also pivot laterally with respect to one another.

16. An apparatus according to claim 1, further comprising resilient biasing means surrounding said die members for resiliently biasing said die members in a generally lateral direction toward one another.

17. An apparatus according to claim 16, wherein said resilient biasing means comprises a polymeric band generally laterally surrounding said die members.

18. An apparatus according to claim 17, wherein said die members include laterally recessed peripheral portions for receiving and retaining said polymeric band.

19. An apparatus according to claim 1, further comprising resilient stripper means surrounding said punch means for biasing said sheet material items together during joining, and for stripping them off said punch means after joining takes place.

* * * * *

UNITED STATES PATENT AND TRADEMARK OFFICE
CERTIFICATE OF CORRECTION

PATENT NO. : 5,208,973
DATED : May 11, 1993
INVENTOR(S) : Edwin G. Sawdon

It is certified that error appears in the above-indentified patent and that said Letters Patent is hereby corrected as shown below:

Column 4, line 45, "thematerial" should be -- the material --.

Column 7, line 43, "282" should be -- 284 --.

Column 7, line 44, "180" should be -- 160 --.

Signed and Sealed this

Twenty-fourth Day of January, 1995

BRUCE LEHMAN

Attest:

Attesting Officer

Commissioner of Patents and Trademarks